United States Patent [19]

Koch

[11] Patent Number: 5,913,522

[45] Date of Patent: Jun. 22, 1999

[54] SPIRALLY-BOUND FLANGE SEAL WITH SEPARATE SOFT LAYERS

[75] Inventor: Jürgen Koch, Oberhausen, Germany

[73] Assignee: Kempchen & Co. GmbH, Oberhausen, Germany

[21] Appl. No.: 08/834,610

[22] Filed: Apr. 14, 1997

[30] Foreign Application Priority Data

Jun. 1, 1996 [DE] Germany ............... 296 09 769 U

[51] Int. Cl.$^6$ ............................................. F16L 17/06
[52] U.S. Cl. ........................... 277/610; 277/627; 277/938
[58] Field of Search .................................... 277/602, 603, 277/608, 610, 627, 633, FOR 184, FOR 237, FOR 241, 938

[56] References Cited

U.S. PATENT DOCUMENTS

| | | |
|---|---|---|
| 5,082,296 | 1/1992 | Aizawa et al. ............................ 277/610 |
| 5,275,423 | 1/1994 | Allen et al. .............................. 277/610 |
| 5,411,274 | 5/1995 | Yahagi et al. ......................... 277/610 X |
| 5,511,797 | 4/1996 | Nikirk et al. ......................... 277/610 X |
| 5,669,613 | 9/1997 | Lubienski ............................... 277/610 |
| 5,683,091 | 11/1997 | Isoe et al. ................................ 277/610 |

*Primary Examiner*—Lynne A. Reichard
*Assistant Examiner*—Greg Binda
*Attorney, Agent, or Firm*—Herbert Dubno

[57] ABSTRACT

A flange seal utilizing a spirally wound steel strip with a V-shaped central portion and a sealing strip between the turns of the steel strip has a pair of layers of soft sealing material on opposite sides of the sealing ring engaging projecting portions of the sealing strip so that the projecting portions of the sealing strip do not exceed 0.5 mm in width beyond the edges of the steel strip.

5 Claims, 3 Drawing Sheets

SPIRALLY-BOUND FLANGE SEAL WITH SEPARATE SOFT LAYERS

FIELD OF THE INVENTION

My present invention relates to a flange seal and, more particularly, to a seal disposed between two flanges of a pipe connection, i.e. a seal of the type in which an annular sealing member is provided between confronting surfaces of a pair of flanges which are drawn together across the seal by bolts spaced around the flanges and thus around the seal. More particularly the invention relates to a flange seal of the type in which a seal ring is formed by a spirally wound steel strip between the turns of which a soft sealing strip is provided.

BACKGROUND OF THE INVENTION

Seals of the aforedescribed type having been used heretofore in flange connections, pipe joints and the like and may, as described in WO 93/07407 corresponding to EP 0606281, have a central V-shaped configuration in the steel strip and a soft sealing strip between the turns of the steel strip.

The soft sealing strip can project beyond the steel strip. The material of the soft sealing strip is selected to match the conditions under which the seal is to be used. For example, when the seal is to operate at high temperatures, for instance, in the range of 400° C. to 500° C., the soft sealing material can be sealing graphite. At lower temperatures the material can be polytetrafluoroethylene The flange connections for which such seals may be used are generally standardized connections between pipes and the like or between vessels such as between exchangers, boilers, chemical processing equipment and pipes. Not only are the dimensions of such flange connections standardized but their fabrication tolerances are largely constant.

The sealing force in a flange connection is generated by tightening the bolts mentioned previously. The nominal dimensions of the sealing rings and the flange connections with which they are used can conform to the German Standards DN 10 to DN 2000 and, of course, corresponding United States dimensions and standards. The thickness of the sealing ring in general should amount to 3.5 to 6.5 mm and it has been common practice where a steel spiral is used in or as part of the seal, to provide a number of inner turns of the steel spiral and a number of outer turns of the steel spiral free from intervening soft sealing turns. In these outer and inner regions, the turns of the steel strip can be welded together.

Although seals of the aforedescribed type have been found to be highly satisfactory for most purposes, fabrication problems have arisen. For example, when the seal is fabricated as described in the aforementioned publication, the soft seal cushion between the steel strip and the juxtaposed faces of the flanges is formed exclusively by the projecting portions of the turns of the soft sealing material, which, for this purpose, must extend by a width of at least 1 mm beyond the steel strip on each side. The cushions of the soft sealing material which are thus formed serve to prevent direct contact of the steel strip with the juxtaposed faces of the flange or at least prevent detrimental contact of the spirally wound steel strip with the flange faces, the projecting portions of the soft material deforming for this purpose upon tightening of the flange coupling. Because it is necessary to carefully position the seal and carefully tighten the flange coupling to uniformly form the cushions as described, the assembly process is time consuming and thus expensive.

Seals utilizing the principles described are generally mass produced by shaping the coil of the steel strip on a V-shaped forming periphery of a wheel and by winding the soft sealing strip into the turns of the steel strip on the wheel as well. On one edge of this wheel a flange is formed and on an opposite edge a flange forming disk cooperates with the coiling wheel. A recess may be provided at the middle of the wheel periphery to accommodate the V-shaped portion of the strip. The depth of the recess can correspond to a radial dimension of the sealing ring and the width of the recess to the width of the soft steel strip. Since the steel strip and the soft seal strip may be simultaneously wound in this groove, there occasionally is a relative shift of the steel strip and the soft sealing strip that can detrimentally influence the sealing ring which results.

In general, the ring must be fabricated with very narrow tolerances to satisfy the requirements for effective flange sealing and the conventional process in many cases was not able to satisfy the need for such narrow tolerances.

While experience has shown that it is possible to wind interleaved turns of the steel strip and soft sealing strip reproducibly when the latter does not project more than 0.5 mm beyond the steel strip and where any projection beyond the steel strip is preferably 0.2 to 0.4 mm, with high tolerances, the projection of the soft sealing strip in excess of 0.5 mm beyond the steel strip results in shifts as described which tend to be additive from turn to turn. In many cases, therefore, the conventional seals did not possess adequate sealing function when fabricated in this manner or the sealing effects were not reproducible. To obtain reproducible seals of the configurations hitherto used, it was necessary, therefore, to resort to much more expensive fabrication techniques.

OBJECTS OF THE INVENTION

It is, therefore, the principal object of the present invention to provide a flange seal which is highly reproducible and can be mass produced in an inexpensive manner.

Another object of the invention is to provide a sealing ring assembly, especially for use as a flange seal, which can satisfy all of the requirements for such a seal and can be reproducibly manufactured in a serial production, e.g. by the winding method described.

SUMMARY OF THE INVENTION

These objects and others which will become apparent hereinafter are attained, in accordance with the invention, in a sealing assembly which comprises a spacer ring adapted to be disposed between the juxtaposed faces of a pair of flanges against which the seal can engage, the flanges being drawn together by bolts in the manner described, and a ring within this spacer ring composed of a spirally wound steel strip with a soft sealing strip wound within the turns of the steel strip and projecting beyond the edge of the steel strip so that the projecting portions of the soft sealing strip engage respective soft sealing layers forming cushions on opposite sides of the steel spiral. The steel strip and the soft sealing strip can have a V-shaped configuration at the center thereof and, according to the invention, in an uncompressed state, the projections have a projecting width of less than 0.5 mm while the soft sealing cushion layers engaged by these projections and flanking the spiral have a thickness in excess of 0.5 mm. According to the invention, the spacer ring defines a gap between the spaces of the surfaces of the flanges which is 2 to 3 mm smaller than the width of the steel strip and than the thickness of the steel spiral in the non-compressed state.

Advantageously, the soft sealing materials of the soft sealing strip and of the layers forming the cushions are of the same material of which in the case of a seal which is to operate at high temperatures, is sealing graphite.

The invention thus does not rely upon the projecting portions of the soft sealing strip to be sufficient to form the cushion and thus need not have the projections of the soft sealing strip extend by a width in the millimeter range beyond the steel strip as has been necessary heretofore when these projecting portions form the soft sealing cushions. Indeed, the soft sealing cushions are formed in the system of the invention by the aforementioned layers which allow the projecting portions of the soft sealing strips to have widths of less than 0.5 millimeter.

As a result the spiral assembly can be formed by the conventional process described in a mass production or serial production with narrow tolerances and high reproducibility. Advantageously in the uncompressed state, the soft sealing strip should project approximately 0.2 mm beyond each edge of the steel strip and the layers lying along the opposite sides of the spirals should have a thickness of 0.5 to 1 mm although a thickness greater than 1 mm can also be used.

The junction between the soft sealing cushion layers and the projecting portions of the soft sealing strip can be formed simply by pressing the two together, i.e. by tightening the flanges and pressing the layers against the edges of the projecting portions of the soft sealing strip. A bond can be formed as well by prepressing the two together or by cementing, utilizing an adhesive, the layers to the edges projecting beyond the steel strip. In that case pressing, at least before the sealing is introduced between the flanges, can be avoided entirely. In general, therefore, the sealing layers on the opposite sides of the spiral can be formfittingly joined to the sealing strip of the spiral on fabrication of the seal or only just before assembly of the seal and the flanges.

BRIEF DESCRIPTION OF THE DRAWING

The above and other objects, features, and advantages will become more readily apparent from the following description, reference being Ode to the accompanying drawing in which.

SPECIFIC DESCRIPTION

Figure 1:
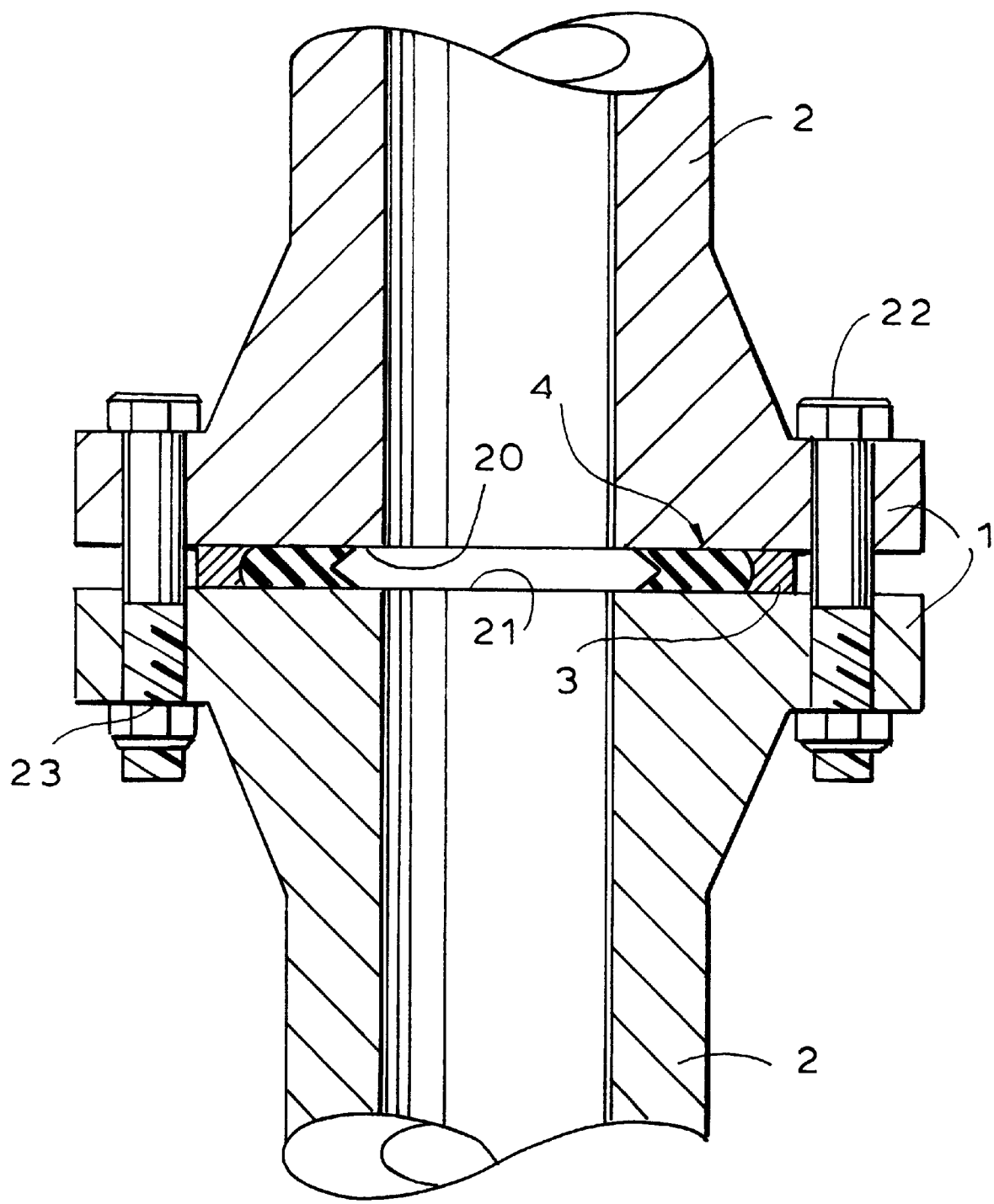
FIG. 1 is an axial cross sectional view through a flange connection provided with a seal according to the invention.

The sealing arrangement of the present invention is provided as a flange seal between a pair of flanges 1 of two pipe lengths 2. Each of the flanges 1 has a surface 20, 21 juxtaposed with the other flange and braced against the sealing ring 4 and a spacer ring 3 upon the tightening of bolts 22. The bolts 22 pass through an array of bores 23 formed in the flanges 1 in angularly equispaced relationship around the ring 3 and the ring 4 (FIG. 1).

Figure 2:
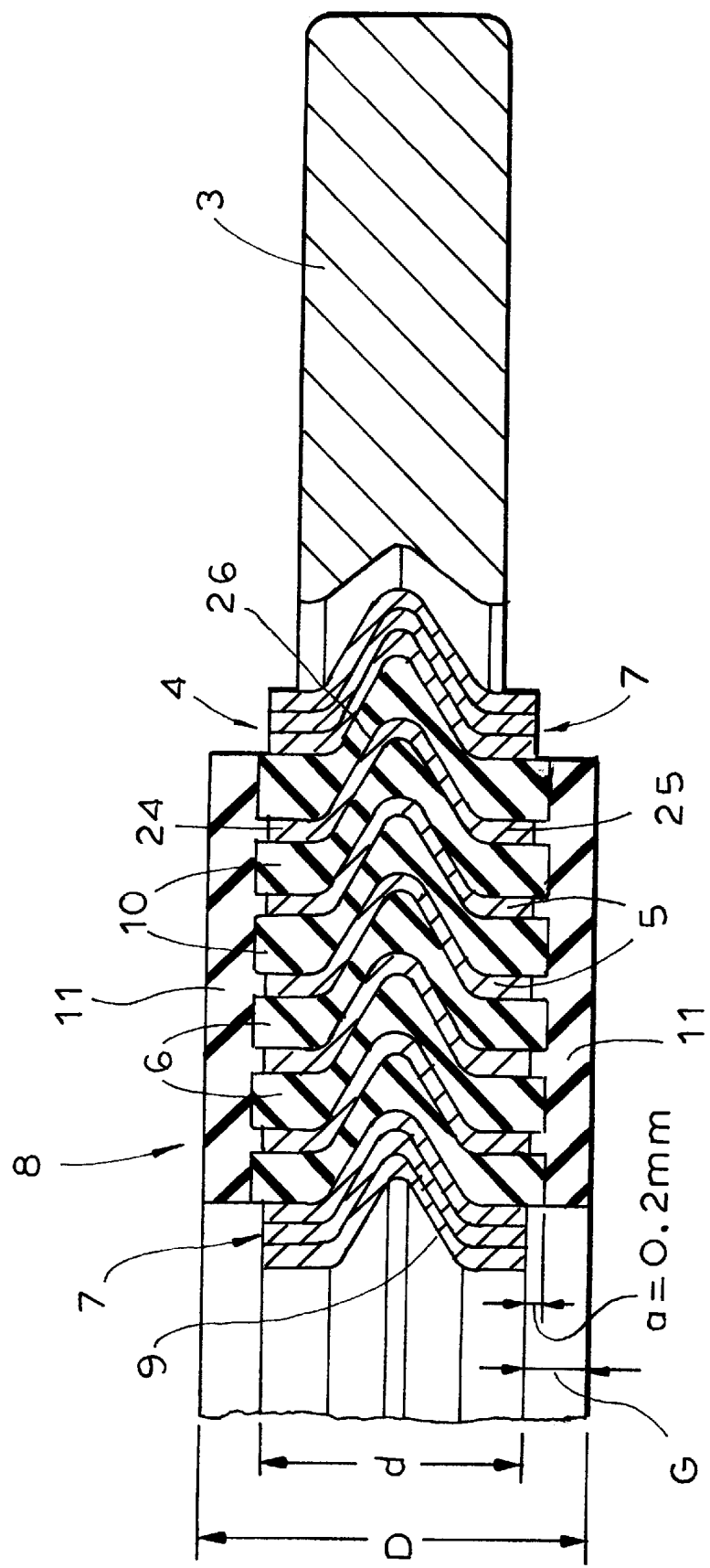
FIG. 2 is a detail cross section of the sealing ring of FIG. 1 in a noncompressed state.
Figure 3:
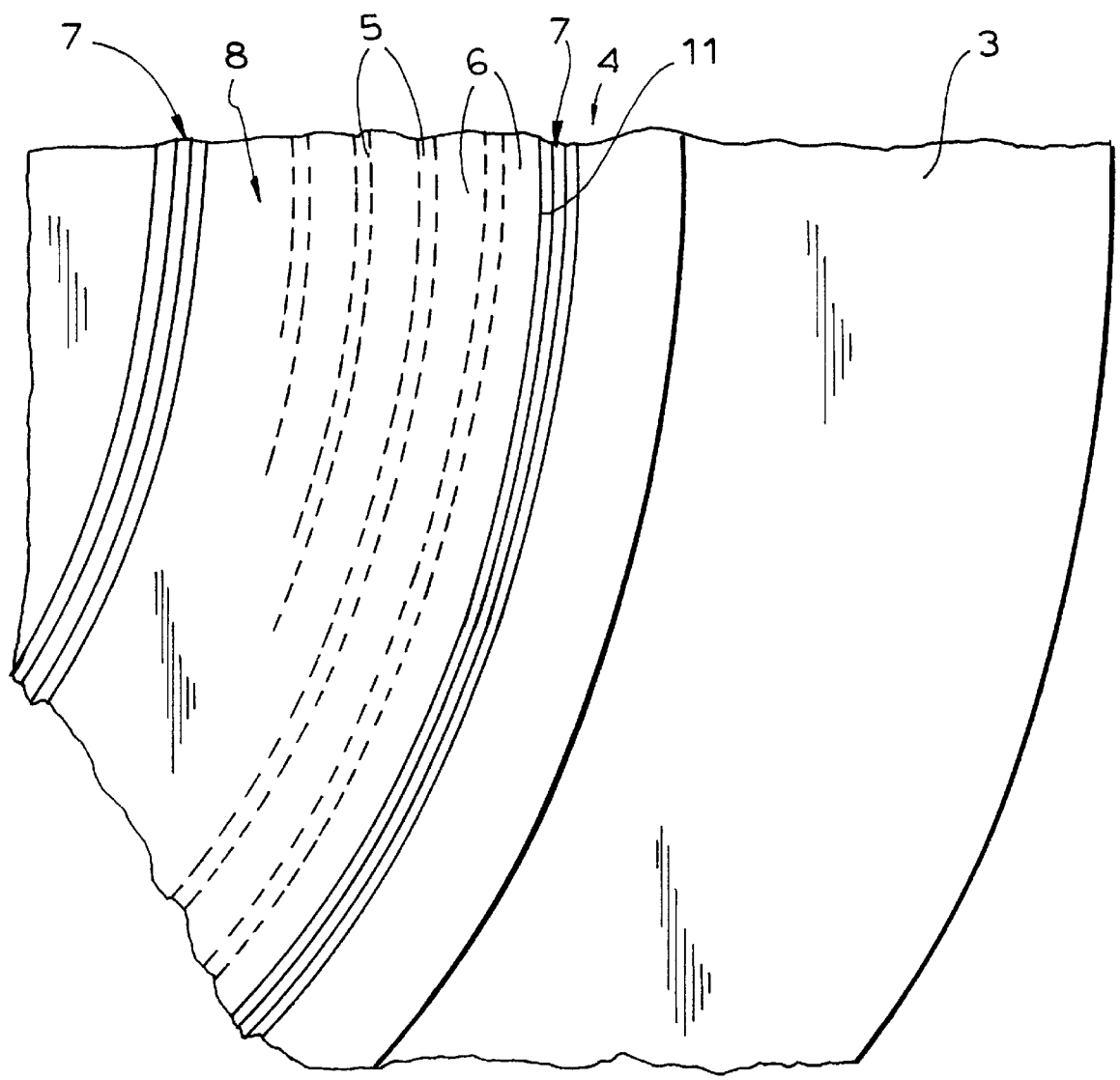
FIG. 3 is a fragmentary plan view of the seal of FIG. 2.

As can be seen from FIGS. 2 and 3, the sealing ring 4 is comprised of a spirally wound steel strip 5 which has, in turn, a pair of flanges 24, 25 flanking a V-shaped central region 26.

Between the turns of the spiral strip 5, there are provided turns of a soft sealing strip 6 of a similar cross-sectional shape. The soft sealing strip 6 is shown of exaggerated thickness in the drawing.

Inner and outer regions 7 of the seal 4 are provided from turns of the steel strip which can be welded together and which do not have intervening turns of the soft sealing strip 6. On the side facing each of the surfaces 20, 21, when on the flange side of the seal 4, respective cushions 8 are formed. These cushions are composed of layers of soft sealing material bonded to or abutting the projecting edges of the strip 6. The layers 11 of the sealing cushions 8 can be formed as rings of the same sealing material as that of the strip 6 so that in the compressed state, the sealing layers 11 merge with the material of the strip 6 in a soft sealing mass that is interposed between the strip 5 and the surfaces 20 and 21 held at a spacing which is less than the overall uncompressed thickness D of the seal 4 and, preferably 2 to 3 mm smaller than the width d of the steel strip 5 in the uncompressed state. The seal 4 in both its compressed state (FIG. 1) and its uncompressssed state (FIG. 2) has a V-shaped region 9.

As can be seen from FIG. 2 as well, the soft sealing strip 6 projects beyond the steel strip 5 by a distance a which can be approximately 0.2 mm and is formed by the projecting portions 10. The projecting portions 10 are provided on both sides.

From the drawing it will be apparent as well that the sealing cushion 8 which is formed by the layers 11 in engagement with the projecting portions 10 can have a thickness b which must be greater than 0.5 mm. The layer 11 itself, therefore, can have a thickness in the uncompressed state of say 0.5 mm to 1 mm or even greater than 1 mm. For illustrative reasons, the projections 10 and the thicknesses of the layers 11 have been exaggerated in FIG. 2.

The spacer ring 3 defines the gap between the flanges to which the ring 4 is compressed (FIG. 1). The layers 11 and the soft sealing strip 6 can be composed of the same material, for example, sealing graphite and in the preferred embodiment, in the uncompressed state, the strip 6 can have a projection 10 to each side of a width of about 0.2 mm.

I claim:

1. A flange seal assembly comprising:
   a pair of flanges having juxtaposed surfaces;
   a spacer ring received between said surfaces and defining a gap between them; and
   a sealing ring received in said gap and compressed between said surfaces, said sealing ring comprising a plurality of spiral turns of a steel strip having edges extending in opposite directions toward said surfaces and a V-shaped central portion between said edges, a soft sealing material strip spirally wound between said turns of said steel strip and having projections beyond said edges of said steel strip on opposite sides of said sealing ring, respective soft sealing cushions formed by said projections, and respective annular soft sealing layers on opposite axial sides of said sealing ring separate from said soft sealing material strip, and wherein, in an uncompressed state of said sealing ring, said projections have widths of less than 0.5 mm beyond said edges of said steel strip, said layers having thicknesses of 0.5 to 1 mm and said spacer ring defines a spacing between said flanges of a width which is 2 mm to 3 mm smaller than a width of said steel strip in said sealing ring.

2. The flange seal defined in claim 1 wherein said soft sealing material strip and said layers are composed of the same material.

3. The flange seal defined in claim 2 wherein said material is sealing graphite.

4. The flange seal defined in claim 3 wherein said projections have widths in said uncompressed state of about 0.2 mm beyond said edges.

5. The flange seal defined in claim 1 wherein said projections have widths in said uncompressed state of about 0.2 mm beyond said edges.

* * * * *